United States Patent
Ishii et al.

(10) Patent No.: US 6,489,431 B1
(45) Date of Patent: Dec. 3, 2002

(54) POLYIMIDE PRECURSORS AND POLYIMIDES

(75) Inventors: Kazuhisa Ishii, Chiba (JP); Takayasu Nihira, Chiba (JP); Hiroyoshi Fukuro, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/806,487

(22) PCT Filed: Oct. 6, 1999

(86) PCT No.: PCT/JP99/05503

§ 371 (c)(1),
(2), (4) Date: Apr. 12, 2001

(87) PCT Pub. No.: WO00/22029

PCT Pub. Date: Apr. 20, 2000

(30) Foreign Application Priority Data

Oct. 13, 1998 (JP) ............................................ 10-290890

(51) Int. Cl.[7] .............................................. C08G 73/10
(52) U.S. Cl. ...................... 528/170; 528/125; 528/128; 528/172; 528/173; 528/174; 528/176; 528/179; 528/183; 528/188; 528/220; 528/229; 528/353
(58) Field of Search .................................. 528/170, 353, 528/125, 128, 172, 173, 174, 176, 179, 183, 220, 229

(56) References Cited

U.S. PATENT DOCUMENTS 5,756,649 A * 5/1998 Mizushima et al. ........ 528/353

FOREIGN PATENT DOCUMENTS

JP 11-100502 4/1999

OTHER PUBLICATIONS

Qinghua Li, et al., Polymer Journal, vol. 30, No. 10, pp. 805–812, "Absorption, Fluorescence, and Thermal Properties of Transparent Polyimides Based On Cyclobutanetetracarboxylic Dianhydride", 1998.

M. Nishikawa, et al., Liquid Crystals, vol. 26, No. 4, pp. 575–580, "Effect of Chemical Structures of Polymides of Photosensitivity of Liquid Crystal Alignment Using a Polarized UV Exposure", 1999.

* cited by examiner

Primary Examiner—P. Hampton-Hightower
(74) Attorney, Agent, or Firm—Oblon, Spivak, McClelland, Maier & Neustadt, P.C.

(57) ABSTRACT

A polyimide precursor having a repeating unit represented by the following general formula (1), wherein $R^1$ contains a bivalent organic group constituting a diamine having a hexafluoropropylidene group in its molecule represented by the following general formula (2), and the reduced viscosity is from 0.05 to 5.0 dl/g (in N-methylpyrrolidone at a temperature of 30° C., concentration: 0.5 g/dl), and a polyimide obtained by imidizing said precursor:

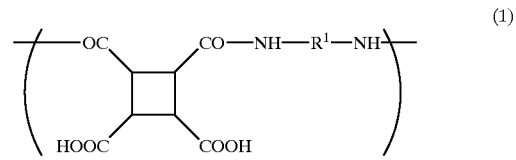

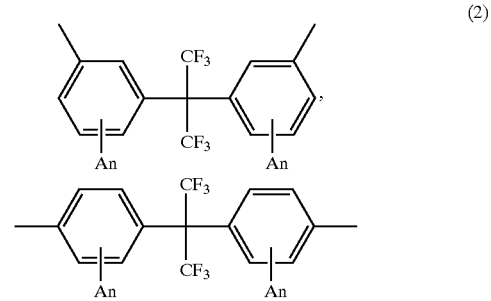

(wherein $R^1$ is a bivalent organic group constituting a diamine, A is a hydrogen atom, a linear alkyl group including a methyl group, or a trifluoromethyl group, and n is the number of a substituent on an aromatic ring and an integer of from 1 to 4).

2 Claims, No Drawings

POLYIMIDE PRECURSORS AND POLYIMIDES

BACKGROUND OF THE INVENTION

1. Technical Field

The present invention relates to a novel polyimide and a polyimide precursor (polyamic acid) as a precursor thereof, useful as e.g. protective films and insulating films for liquid crystal display devices and semiconductor devices, and as optical waveguide materials for optical communication, excellent in transparency at not only a visible region but also an ultraviolet region even after baking at a high temperature of from 270° C. to 350° C, and having characteristics such as a low dielectric constant, a low birefringence and a high heat resistance.

2. Background Art

Wholly aromatic polyimide are insoluble in a solvent in general, and by coating a polyimide precursor as a precursor thereof on a substrate by e.g. casting or spin coating, followed by heating at a high temperature, a desired polyimide can be obtained. All such heat resistant aromatic polyimides present deep amber and are colored in general.

Polyimides are widely used as protective materials or insulating materials for liquid crystal display devices and semiconductor devices by virtue of the high mechanical strength, heat resistance, insulating properties and solvent resistance. They are used also as optical waveguide materials for optical communication. However, developments in these fields have been remarkable in recent years, and increasingly high levels of properties have been required for the materials to be used in such fields. Namely, they are expected not only to be excellent in heat resistance, but also to have various performances depending upon application.

In recent years, protective materials and insulating materials for liquid crystal display devices and semiconductor devices are required not only to have a heat resistance but also to maintain transparency at not only a visible region but also an ultraviolet region after baking at a high temperature of from 270° C. to 350° C., or to have a low birefringence and a low dielectric constant when formed into a coating film in some cases.

For example, with respect to a buffer coating material as a protective film for a specific semiconductor device, in order to erase memory errors generated during preparation of the element, through-holes are formed by utilizing lithography technology for electrical erasion, and such makes the process complicated. If the buffer coating material has transparency to ultraviolet light, optical erasion by UV irradiation alone becomes possible without formation of through-holes, and the process can be simplified. In such a case, great absorption of ultraviolet light is fatal. Further, in a field of specific optical waveguide materials, materials having not only a high heat resistance but also a small birefringence and a high transparency at an ultraviolet region are desired.

As one method for realizing transparency at a visible region, it is well known to obtain a polyimide precursor by a polycondensation reaction of an aliphatic tetracarboxylic dianhydride with a diamine, followed by imidizing said precursor to produce a polyimide, whereby a polyimide which is relatively less colored and is excellent in transparency can be obtained (JP-B-2-24294, JP-A-58-208322).

It is certain that when a polyimide is prepared by such a known method using an aromatic diamine as a diamine, a polyimide having excellent transparency at a visible region in the vicinity of 400 nm will be obtained, but a great absorption will usually appear at an ultraviolet region in the vicinity of 300 nm, where electron transition absorption of an aromatic ring is present. Further, many of aliphatic tetracarboxylic dianhydrides have a low reactivity in general, and it is thereby difficult to obtain a polymer having a high degree of polymerization unless structurally suitable one is selected.

Further, as a method to reduce absorption at not only a visible region but also an ultraviolet region and to present a coating film having a low birefringence, a polyimide consisting of a combination of an aliphatic tetracarboxylic dianhydride with a specific aliphatic diamine has been proposed (W. Folksen et al., Reactive & Functional polymer, vol. 30, Page 61, 1996). It is certain that a polyimide consisting of this combination is excellent in transparency at not only a visible region but also an ultraviolet region, but a coating film tends to be yellow by baking at a high temperature in the vicinity of 300° C., and is poor in heat resistance. Further, basicity of an aliphatic diamine is high as compared with that of an aromatic diamine, and accordingly the aliphatic diamine tends to form a salt with a carboxylic acid generated during polymerization, whereby it is difficult to control solubility, and polymerization may not proceed in some cases, and thus it is difficult to say the method is common.

DISCLOSURE OF THE INVENTION

Under these circumstances, the present invention has been made to provide a novel polyimide excellent in transparency at not only a visible region but also ultraviolet region after baking at a high temperature of from 270° C. to 350° C., and having characteristics such as a low dielectric constant, a low birefringence and a high heat resistance.

The present inventors have conducted extensive studies to overcome the above problems and as a result, found that a polyimide obtained by imidizing a polyimide precursor comprising a specific diamine having cyclobutanetetracarboxylic dianhydride and a hexafluoropropylidene group in its molecule can achieve the above object. The present invention has been accomplished on the basis of the above discovery.

Namely, the present invention relates to a polyimide precursor having a repeating unit represented by the following general formula (1):

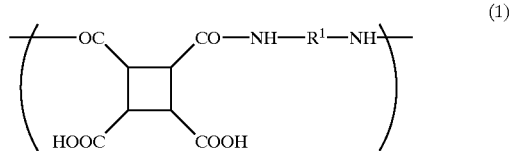

(wherein $R^1$ is a bivalent organic group constituting a diamine), wherein $R^1$ contains a bivalent organic group constituting a diamine having a hexafluoropropylidene group in its molecule represented by the following general formula (2):

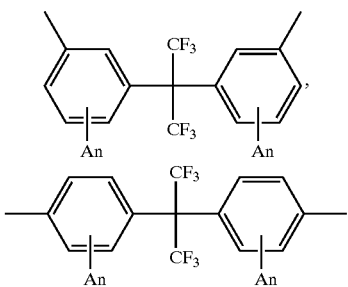

(2)

(wherein A is a hydrogen atom, a linear alkyl group including a methyl group, or a trifluoromethyl group, and n is the number of a substituent on an aromatic ring and an integer of from 1 to 4), and the reduced viscosity is from 0.05 to 5.0 dl/g (in N-methylpyrrolidone at a temperature of 30° C., concentration: 0.5 g/dl), and further relates to a polyimide having a repeating unit of the general formula (3):

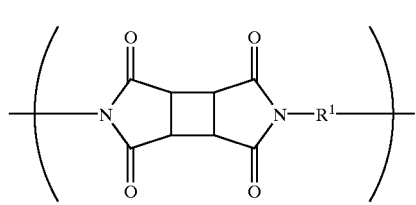

(3)

(wherein $R^1$ is the same as in the above formula (2)) which is obtained by imidizing said precursor.

Now, the present invention will be explained in further detail below.

A tetracarboxylic component to be used to obtain the polyimide precursor represented by the above general formula (1) of the present invention is cyclobutanetetracarboxylic acid, its dianhydride and its dicarboxylic acid diacid halide.

The diamine component may, for example, be 2,2-bis(3-aminophenyl)hexafluoropropane, 2,2-bis(4-methyl-3-aminophenyl)hexafluoropropane, 2,2-bis(4,5-dimethyl-3-aminophenyl)hexafluoropropane, 2,2-bis(4-trifluoromethyl-3-aminophenyl)hexafluoropropane, 2,2-bis(4,5-bistrifluoromethyl-3-aminophenyl)hexafluoropropane, 2,2-bis(4-aminophenyl)hexafluoropropane, 2,2-bis(3-methyl-4-aminophenyl)hexafluoropropane, 2,2-bis(2,3-dimethyl-4-aminophenyl)hexafluoropropane, 2,2-bis(3-trifluoromethyl-4-aminophenyl)hexafluoropropane or 2,2-bis(2,3-bistrifluoromethyl-4-aminophenyl)hexafluoropropane. They may be used alone or in combination as a mixture of two or more of them.

In order to achieve the effects of the present invention, preferably from 70 mol % to 100 mol % of a polyimide precursor consisting of the above combination is contained so as to obtain the effects of the present invention remarkably also.

As the other tetracarboxylic dianhydride components, tetracarboxylic dianhydrides and their derivatives, commonly used for synthesis of a polyimide, can be used without any problem.

Specific examples thereof include alicyclic tetracarboxylic acids such as 1,2,3,4-cyclopentanetetracarboxylic acid, 2,3,4,5-tetrahydrofurantetracarboxylic acid, 1,2,4,5-cyclohexanetetracarboxylic acid, 3,4-dicarboxy-1-cyclohexyl succinic acid and 3,4-dicarboxy-1,2,3,4-tetrahydro-1-naphthalene succinic acid, their dianhydrides and their dicarboxylic acid diacid halides.

Further, aromatic tetracarboxylic acids such as pyromellitic acid, 2,3,6,7-naphthalene tetracarboxylic acid, 1,2,5,6-naphthalene tetracarboxylic acid, 1,4,5,8-naphthalene tetracarboxylic acid, 2,3,6,7-anthracene tetracarboxylic acid, 1,2,5,6-anthracene tetracarboxylic acid, 3,3',4,4'-biphenyl tetracarboxylic acid, 2,3,31,4-biphenyl tetracarboxylic acid, bis(3,4-dicarboxyphenyl) ether, 3,3',4,4'-benzophenone tetracarboxylic acid, bis(3,4-dicarboxyphenyl)sulfone, bis(3,4-dicarboxyphenyl)methane, 2,2-bis(3,4-dicarboxyphenyl) propane, 1,1,1,3,3,3-hexafluoro-2,2-bis(3,4-dicarboxyphenyl)propane, bis(3,4-dicarboxyphenyl) dimethyl silane, bis(3,4-dicarboxyphenyl)diphenyl silane, 2,3,4,5-pyridine tetracarboxylic acid and 2,6-bis(3,4-dicarboxyphenyl)pyridine, and their dianhydrides and their dicarboxylic acid diacid halides; and aliphatic tetracarboxylic acids such as 1,2,3,4-butane tetracarboxylic acid, and their dianhydrides and their dicarboxylic acid diacid halides, may, for example, be mentioned.

Further, one or more of these tetracarboxylic acids and their derivatives may be used in mixture.

As the other diamine components, a primary diamine to be commonly used for synthesis of a polyimide may be mentioned, and they are not particularly limited.

Specific examples thereof include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy) diphenylsulfone, 2,2-bis[4-(4-aminophenoxy)phenyl] propane, 2,2'-trifluoromethyl-4,4'-diaminobiphenyl and 4,4'-bis(4-diaminophenoxy)octafluorobiphenyl; alicyclic diamines such as bis(4-aminocyclohexyl)methane and bis (4-amino-3-methylcyclohexyl)methane, and aliphatic diamines such as tetramethylenediamine and hexamethylenediamine; as well as diaminocycloxanes such as

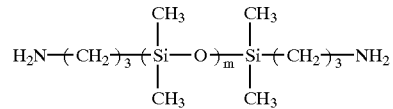

(wherein m is an integer of from 1 to 10). Further, these diamines may be used alone or in combination as a mixture of two or more of them.

As a method to obtain the polyimide precursor of the present invention, specifically, said tetracarboxylic dianhydride and its derivative are reacted and polymerized with the above diamine. The ratio of the molar amount of the tetracarboxylic dianhydride to the total molar amount of the diamine and common diamines, is preferably from 0.8 to 1.2. Like in a usual polycondensation reaction, the polymerization degree of the resulting polymer tends to be large, as the molar ratio becomes close to 1. In such a case, if the polymerization degree is too small, strength of the polyimide film tends to be inadequate. On the other hand, if the polymerization degree is too large, the operation efficiency at the time of formation of the polyimide film tends to be poor in some cases. Accordingly, the polymerization degree of the product in this reaction is preferably from 0.05 to 5.0 dl/g (in N-methylpyrrolidone at a temperature of 30° C., concentration: 0.5 g/dl) as calculated as the reduced viscosity of the polyimide precursor solution.

A method of reacting and polymerizing Etetracarboxylic dianhydride with the above diamine is not particularly limited, but it is common to employ a method wherein the above diamine is dissolved in a polar solvent such as N-methylpyrrolidone, and to the solution, the tetracarboxylic dianhydride is added and reacted to synthesize a polyimide precursor. The reaction temperature may be an optional temperature selected within a range of from −20° C. to 150° C., preferably from −5° C. to 100° C.

As a polymerization method of a polyamic acid, a conventional solution method is suitable. Specific examples of the solvent to be used for the solution polymerization include N,N-dimethylformamide, N,N-dimethylacetamide, N-methyl-2-pyrrolidone, N-methyl caprolactam, dimethyl sulfoxide, tetramethyl urea, pyridine, hexamethylphospholamide and butyrolactone. They may be used alone or in mixture. Further, a solvent in which a polyimide precursor is not dissolved may be added to the above solvent within a range where homogeneous solution is obtained.

The polyimide precursor solution of the present invention may be used as it is, or may be used as an organic solvent-soluble polyimide. A method of obtaining an organic solvent-soluble polyimide is not particularly limited, but it may be obtained by dehydration ring-closure imidization of a polyimide precursor in general.

The polyimide precursor obtained by reacting the tetracarboxylic dianhydride with the diamine, may be kept in a solution and imidized to obtain a solvent-soluble polyimide solution.

To convert the polyimide precursor to a polyimide in the solution, it is common to employ a method wherein dehydration ring closure is carried out by heating. The ring closure temperature by dehydration under heating may be an optional temperature selected within a range of from 100° C. to 350° C., preferably from 150° C. to 350° C., more preferably from 270° C. to 350° C. The reason why the temperature should be at least 270° C. is to assure long-term reliability of a coating film by completely converting the polyamic acid into a polyimide and by removing a remaining solvent. Further, it is not necessary to conduct baking at a temperature exceeding 350° C. since no further improvement in baking effect will be achieved.

As another method for converting the polyimide precursor to the polyimide, it is possible to carry out ring closure chemically by means of a known dehydration ring-closing catalyst. Further, it is possible to achieve an optional degree of imidization by selecting the temperature or time during dehydration ring closure. The solvent for dissolution is not particularly limited so long as it is capable of dissolving the obtained polyimide, and examples of which include m-cresol, 2-pyrrolidone, N-methylpyrrolidone, N-ethylpyrrolidone, N-vinylpyrrolidone, N,N-dimethylacetoamide, N,N-dimethylformamide and γ-butyrolactone.

The polyimide solution thus obtained may be used as it is, or may be precipitated and isolated in a poor solvent such as methanol or ethanol to obtain a polyimide as a powder, or said polyimide powder may be re-dissolved in a proper solvent.

The solvent for re-dissolution is not particularly limited so long as it is capable of dissolving the polyimide, and examples of which include 2-pyrrolidone, N-methylpyrrolidone, N-ethylpyrrolidone, N-vinylpyrrolidone, N,N-dimethylacetoamide, N,N-dimethylformamide and γ-butyrolactone.

The above polyimide precursor and the solvent-soluble polyimide may be used as they are, or they may be mixed with one or more polyimide precursor or solvent-soluble polyimide. The mixing ratio may optionally be selected.

The solvent to be used for the solvent-soluble polyimide of the present invention is not particularly limited so long as it is capable of dissolving the polyimide, and examples of which include 2-pyrrolidone, N-methylpyrrolidone, N-ethylpyrrolidone, N-vinylpyrrolidone, N,N-dimethylacetoamide, N,N-dimethylformamide and γ-butyrolactone.

Further, even a solvent incapable of dissolving the polymer by itself may be added to the above solvent within a range of not impairing the solubility.

Examples thereof include ethyl cellosolve, butyl cellosolve, ethyl carbitol, butyl carbitol, ethyl carbitol acetate and ethylene glycol.

Further, for the purpose of further improving the adhesion of the polyimide film to a substrate, it is of curse preferred to add an additive such as a coupling agent to the obtained polyimide solution.

This solution is coated on a substrate, and the solvent is evaporated, whereby a polyimide coating film can be formed on the substrate. As the temperature at that time, a temperature of from 100 to 300° C. is usually sufficient.

BEST MODE FOR CARRYING OUT THE INVENTION

Now, the present invention will be explained in further detail with reference to Examples, but the present invention is by no means restricted thereto. Here, physical properties of the obtained polyimide were evaluated by means of the following apparatuses and methods.

1) Viscosity Measurement

An NMP solution having a solid content of 0.5 wt % was prepared, and measurement was carried out by using an Ubbellohde viscometer at 30° C.

2) Ultraviolet Spectrum

UV-3100PC manufactured by Shimadzu Corporation was used.

3) 5% Weight Loss Temperature

Measured by using a thermogravimetric analyzer manufactured by Mac Science at a temperature-increasing rate of 10° C./min.

4) Glass Transition Temperature

Measured by using a thermomechanical measuring apparatus manufactured by Mac Science with a load of 5 g at a temperature-increasing rate of 5° C./min.

5) Index of Birefringence

By using a prism coupler model 2010 manufactured by Metricon, employing TE and TM direction polarizations at a wavelength of 633 nm with a film thickness of $2 \times 10^3$ nm, and the difference thereof was obtained.

6) Dielectric constant

Measured by using an AG-4311BLCR meter and SE-70 model electrode for solid, manufactured by Ando Electric Co., Ltd., at 25° C. at 100 kHz.

EXAMPLE 1

Into a flask equipped with a stirrer and a nitrogen introduction tube, 33.4 g (0.1 mol) of 2,2'-bis(3-aminophenyl) hexafluoropropane and 299.2 g of N-methyl-2-pyrrolidone (hereinafter referred to simply as NMP) were introduced and dissolved. To this solution, 19.4 g (0.099 mol) of cyclobutanetetracarboxylic dianhydride was added at room temperature while paying attention to increase in the temperature of the solution, followed by stirring for 6 hours, to obtain a polyimide precursor (polyamic acid) solution. The obtained polyimide precursor had a reduced viscosity of 0.6 dl/g (in NMP at 30° C., concentration: 0.5 g/dl).

This solution was spin-coated on a quartz substrate at 1500 rpm, followed by heat treatment at 80° C. for 5 minutes and at 300° C. for 1 hour to form a polyimide film having a thickness of $1.5 \times 10^3$ nm.

The ultraviolet spectrum of the polyimide film was measured, and it was found that the transmittance at a wavelength of 300 nm was 85% and the transmittance at 400 nm was 96%, and the film had a high transmittance even at an ultraviolet region.

The polyimide film was further subjected to a heat treatment in an oven at 250° C. for one day, and then ultraviolet spectrum was measured, whereupon the transmittance at a wavelength of 300 nm was 83%, the transmittance at 400 nm was 96%, and a high transmittance was maintained.

Then, the polyimide precursor solution was coated on a glass substrate, followed by baking at 300° C. for 1 hour to obtain a film having a film thickness of $10 \times 10^3$ nm. The starting temperature of 5% weight loss was 420° C. as measured by using said film, the glass transition temperature was 350° C., and the film had a high heat resistance.

Further, a polyimide film (film thickness: $2 \times 10^3$ nm) was prepared in the same manner, and the birefringence measured by means of a prism coupler method was 0.0023 (TE direction: 1.5384, TM direction: 1.5361).

Then, the polyimide precursor solution was spin-coated at 1500 rpm on a glass substrate having an aluminum layer formed thereon by vapor deposition, followed by a heat treatment at 80° C. for 5 minutes and at 300° C. for 1 hour, to form a polyimide film having a thickness of $1.5 \times 10^3$ nm. Further, an aluminum electrode having a diameter of 6 mm was formed on the polyimide film by vapor deposition to prepare a sample for electrical measurement.

The dielectric constant of the polyimide film was measured by using said sample, and it was 2.77 at a frequency of 100 kHz.

EXAMPLE 2

Into a flask equipped with a stirrer and a nitrogen introduction tube, 33.4 g (0.1 mol) of 2,2'-bis(4-aminophenyl) hexafluoropropane and 299.2 g of NMP were introduced and dissolved. To this solution, 19.4 g (0.099 mol) of cyclobutanetetracarboxylic dianhydride was added at room temperature while paying attention to increase in the temperature of the solution, followed by stirring for 6 hours, to obtain a polyimide precursor (polyamic acid) solution. The obtained polyimide precursor had a reduced viscosity of 0.8 dl/g (in NMP at 30° C., concentration: 0.5 g/dl).

This solution was spin-coated on a quartz substrate at 4000 rpm, followed by heat treatment at 80° C. for 5 minutes and at 300° C. for 1 hour to form a polyimide film having a thickness of $1.5 \times 10^3$ nm.

The ultraviolet spectrum of the polyimide film was measured, and it was found that the transmittance at a wavelength of 300 nm was 81% and the transmittance at 400 nm was 95%, and the film had a high transmittance even at an ultraviolet region.

The polyimide film was further subjected to a heat treatment in an oven at 250° C. for one day, and then ultraviolet spectrum was measured, whereupon the transmittance at a wavelength of 300 nm was 77% (original: 70), the transmittance at 400 nm was 92% (original: 89), and a high transmittance was maintained.

Then, the polyimide precursor solution was coated on a glass substrate, followed by baking at 300° C. for 1 hour to obtain a film having a film thickness of $10 \times 10^3$ nm. The starting temperature of 5% weight loss was 430° C. (original: 420° C.) as measured by using said film, the glass transition temperature was 378° C. (original: 350° C.), and the film had a high heat resistance.

Further, the birefringence measured by means of a prism coupler method was 0.0040 (TE direction: 1.5685, TM direction: 1.5645).

Then, the polyimide precursor solution was spin-coated at 4000 rpm on a glass substrate having an aluminum layer formed thereon by vapor deposition, followed by a heat treatment at 80° C. for 5 minutes and at 300° C. for 1 hour, to form a polyimide film having a thickness of $1.5 \times 10^3$ nm. Further, an aluminum electrode having a diameter of 6 mm was formed on the polyimide film by vapor deposition to prepare a sample for electrical measurement.

The dielectric constant of the polyimide film was measured by using said sample, and it was 2.87 at a frequency of 100 kHz.

EXAMPLE 3

Into a flask equipped with a stirrer and a nitrogen introduction tube, 32.5 g (0.09 mol) of 2,2'-bis(3-methyl-4-aminophenyl)hexafluoropropane and 112 g of NMP were introduced and dissolved. To this solution, 17.6 g (0.09 mol) of cyclobutanetetracarboxylic dianhydride was added at room temperature while paying attention to increase in the temperature of the solution, followed by stirring for 24 hours, to obtain a polyimide precursor (polyamic acid) solution. The obtained polyimide precursor had a reduced viscosity of 0.9 dl/g (in NMP at 30° C., concentration: 0.5 g/dl). Then, the solution was diluted with NMP, followed by a catalyst imidization reaction using acetic anhydride and pyridine. The reaction mixture was poured into excess of water, and a powder thus deposited was collected by filtration and dried. The degree of imidization was 100% from NMR and IR spectra. This powder was dissolved in γ-butyrolactone and used for the following evaluations.

This polyimide solution was spin-coated on a quartz substrate at 4000 rpm, followed by heat treatment at 80° C. for 5 minutes and at 300° C. for 1 hour to form a polyimide film having a thickness of $1.5 \times 10^3$ nm.

The ultraviolet spectrum of the polyimide film was measured, and it was found that the transmittance at a wavelength of 300 nm was 87% and the transmittance at 400 nm was 98%.

The polyimide film was further subjected to a heat treatment in an oven at 250° C. for one day, and then ultraviolet spectrum was measured, whereupon the transmittance at a wavelength of 300 nm was 85%, the transmittance at 400 nm was 98%, and a high transmittance was maintained.

Then, the polyimide solution was coated on a glass substrate, followed by baking at 300° C. to obtain a film having a film thickness of $10 \times 10^3$ nm. The starting temperature of 5% weight loss was 419° C. as measured by using said film, the glass transition temperature was 301° C., and the film had a high heat resistance.

Further, the birefringence measured by means of a prism coupler method was 0.003 (TE direction: 1.519, TM direction: 1.516).

Then, the polyimide solution was spin-coated at 4000 rpm on a glass substrate having an aluminum layer formed thereon by vapor deposition, followed by a heat treatment at 80° C. for 5 minutes and at 300° C. for 1 hour, to form a polyimide film having a thickness of 1.5×10³ nm. Further, an aluminum electrode having a diameter of 6 mm was formed on the polyimide film by vapor deposition to prepare a sample for electrical measurement.

The dielectric constant of the polyimide film was measured by using said sample, and it was 2.58 at a frequency of 100 kHz.

COMPARATIVE EXAMPLE 1

Into a flask equipped with a stirrer and a nitrogen introduction tube, 51.8 g (0.1 mol) of 2,2'-bis[4-(4-aminophenoxy)phenyl] hexafluoropropane and 403.5 g of NMP were introduced and dissolved. To this solution, 19.4 g (0.099 mol) of cyclobutanetetracarboxylic dianhydride was added at room temperature while paying attention to increase in the temperature of the solution, followed by stirring for 6 hours, to obtain a polyimide precursor (polyamic acid) solution. The obtained polyimide precursor had a reduced viscosity of 0.6 dl/g (in NMP at 30° C., concentration: 0.5 g/dl).

This solution was spin-coated on a quartz substrate at 2000 rpm, followed by heat treatment at 80° C. for 5 minutes and at 300° C. for 1 hour to form a polyimide film having a thickness of 1.5×10³ nm.

The ultraviolet spectrum of the polyimide film was measured, and it was found that the transmittance at a wavelength of 300 nm was 50% and the transmittance at 400 nm was 94%, and the transmittance at an ultraviolet region was low.

The polyimide film was further subjected to a heat treatment in an oven at 250° C. for one day, and then ultraviolet spectrum was measured, whereupon the transmittance at a wavelength of 300 nm was 45%, the transmittance at 400 nm was 88%, and the transmittance further decreased.

Then, the polyimide precursor solution was coated on a glass substrate, followed by. baking at 300° C. for 1 hour to obtain a film having a film thickness of 10×10³ nm. The starting temperature of 5% weight loss was 420° C. as measured by using said film, and the glass transition temperature was 350° C.

Further, the birefringence measured by means of a prism coupler method was 0.0218 (TE direction: 1.5773, TM direction: 1.5555).

Then, the polyimide precursor solution was spin-coated at 2000 rpm on a glass substrate having an aluminum layer formed thereon by vapor deposition, followed by a heat treatment at 80° C. for 5 minutes and at 300° C. for 1 hour, to form a polyimide film having a thickness of 1.5×10³ nm. Further, an aluminum electrode having a diameter of 6 mm was formed on the polyimide film by vapor deposition to prepare a sample for electrical measurement.

The dielectric constant of the polyimide film was measured by using said sample, it was 2.81 at a frequency of 100 kHz.

COMPARATIVE EXAMPLE 2

Into a flask equipped with a stirrer and a nitrogen introduction tube, 33.4 g (0.1 mol) of 2,2-bis(3-aminophenyl) hexafluoropropane and 438.6 g of NMP were introduced and dissolved. To this solution, 44.0 g (0.099 mol) of 2,2-bis(3, 4-dicarboxyphenyl)hexafluoropropane dianhydride was added at room temperature while paying attention to increase in the temperature of the solution, followed by stirring for 6 hours, to obtain a polyimide precursor (polyamic acid) resin solution. The obtained polyimide precursor had a reduced viscosity of 0.8 dl/g (in NMP at 30° C., concentration: 0.5 g/dl).

This solution was spin-coated on a quartz substrate at 2000 rpm, followed by heat treatment at 80° C. for 5 minutes and at 300° C. for 1 hour to form a polyimide film having a thickness of 1.5×10³ nm.

The ultraviolet spectrum of the polyimide film was measured, and it was found that the transmittance at a wavelength of 300 nm was 9% and the transmittance at 400 nm was 97%, and the transmittance at an ultraviolet region was extremely low.

The polyimide film was further subjected to a heat treatment in an oven at 250° C. for one day, and then ultraviolet spectrum was measured, whereupon the transmittance at a wavelength of 300 nm was 9%, and the transmittance at 400 nm was 97%.

Then, the polyimide precursor solution was coated on a glass substrate, followed by baking at 300° C. for 1 hour to obtain a film having a film thickness of 10×10³ nm. The starting temperature of 5% weight loss was 520° C. as measured by using said film, and the glass transition temperature was 248° C.

Further, the birefringence measured by means of a prism coupler method was 0.0034 (TE direction: 1.5419, TM direction: 1.5384).

Then, the polyimide precursor solution was spin-coated at 2000 rpm on a glass substrate having an aluminum layer formed thereon by vapor deposition, followed by a heat treatment at 80° C. for 5 minutes and at 300° C. for 1 hour, to form a polyimide film having a thickness of 1.5×10³ nm. Further, an aluminum electrode having a diameter of 6 mm was formed on the polyimide film by vapor deposition to prepare a sample for electrical measurement.

The dielectric constant of the polyimide film was measured by using said sample, and it was 2.63 at a frequency of 100 kHz.

COMPARATIVE EXAMPLE 3

Into a flask equipped with a stirrer and a nitrogen introduction tube, 13.8 g (0.1 mol) of bis(4-Eaminocyclohexyl) methane and 188.1 g of NMP were introduced and dissolved. Into this solution, 19.4 g (0.099 mol) of cyclobutanetetracarboxylic dianhydride was added at room temperature while paying attention to increase in the temperature of the solution. Due to high basicity of the diamine in the reaction solution, a complex insoluble in NMP was formed with the carboxylic acid, and accordingly the reaction solution was stirred for at least 24 hours to dissolve the complex and to conduct polymerization, and a polyimide precursor (polyamic acid) solution was obtained. The obtained polyimide precursor had a reduced viscosity of 0.8 dl/g (in NMP at 30° C., concentration: 0.5 g/dl).

This solution was diluted with NMP to a total solid content of 8 wt %, and spin-coated on a quartz substrate at 2000 rpm, followed by a heat treatment at 80° C. for 5 minutes and at 250° C. for 1 hour, to form a polyimide film having a thickness of 1.5×10³ nm.

The ultraviolet spectrum of the polyimide film was measured, whereupon the transmittance at a wavelength of 300 nm was 82%, the transmittance at 400 nm was 95%, and the film had a high transmittance.

However, the ultraviolet spectrum was measured after the polyimide film was subjected to a heat treatment in an oven at 250° C. for one day, whereupon the transmittance at a wavelength of 300 nm was 6%, the transmittance at 400 nm was 45%, and the transmittance greatly decreased.

Then, the polyimide precursor solution was coated on a glass substrate, followed by baking at 250° C. for 1 hour to obtain a film having a film thickness of 10×10³ nm. The starting temperature of 5% weight loss was 360° C. as measured by using said film, and the glass transition temperature was 310° C.

Further, the birefringence measured by means of a prism coupler method was 0.0040 (TE direction: 1.5330, TM direction: 1.5290).

Then, the polyimide precursor solution was spin-coated at 4000 rpm on a glass substrate having an aluminum layer formed thereon by vapor deposition, followed by a heat treatment at 80° C. for 5 minutes and at 250° C. for 1 hour, to form a polyimide film having a thickness of 1.5×10³ nm. Further, an aluminum electrode having a diameter of 6 mm was formed on the polyimide film by vapor deposition to prepare a sample for electrical measurement.

The dielectric constant of the polyimide film was measured by using said sample, and it was 3.00 at a frequency of 100 kHz.

COMPARATIVE EXAMPLE 4

Into a flask equipped with a stirrer and a nitrogen introduction tube, 13.8 g (0.1 mol) of bis(4-aminocyclohexyl) methane and 329.8 g of NMP were introduced and dissolved. Into this solution, 44.4 g (0.1 mol) of 2,2-bis(3,4-dicarboxyphenyl)hexafluoropropane dianhydride was added at room temperature while paying attention to increase in the temperature of the solution. Due to high basisity of the diamine in the reaction solution, a complex insoluble in NMP was formed with the carboxylic acid, and accordingly the reaction solution was stirred for at least 24 hours to dissolve the complex and to conduct polymerization, and a polyimide precursor (polyamic acid) solution was obtained. The obtained polyimide precursor had a reduced viscosity of 0.6 dl/g (in NMP at 30° C., concentration: 0.5 g/dl).

This solution was diluted with NMP to a total solid content of 10 wt %, and spin-coated on a quartz substrate at 1500 rpm, followed by a heat treatment at 80° C. for 5 minutes and at 250° C. for 1 hour, to form a polyimide film having a thickness of 1.5×10³ nm.

The ultraviolet spectrum of the polyimide film was measured, whereupon the transmittance at a wavelength of 300 nm was 9%, the transmittance at 400 nm was 97%, and the transmittance at ultraviolet region was extremely low.

The polyimide film was further subjected to a heat treatment in an oven at 250° C. for one day, and the ultraviolet spectrum was measured, whereupon the transmittance at a wavelength of 300 nm was 5%, the transmittance at 400 nm was 70%, and the transmittance further decreased.

Then, the polyimide precursor solution was coated on a glass substrate, followed by baking at 300° C. for 1 hour to obtain a film having a film thickness of 10×10³ nm. The starting temperature of 5% weight loss was 394° C. as measured by using said film, and the glass transition temperature was 258° C.

Further, the birefringence measured by means of a prism coupler method was 0.0063 (TE direction: 1.5405, TM direction: 1.5342).

Then, the polyimide precursor solution was spin-coated at 4000 rpm on a glass substrate having an aluminum layer formed thereon by vapor deposition, followed by a heat treatment at 80° C. for 5 minutes and at 250° C. for 1 hour, to form a polyimide film having a thickness of 1.5×10³ nm. Further, an aluminum electrode having a diameter of 6 mm was formed on the polyimide film by vapor deposition to prepare a sample for electrical measurement.

The dielectric constant of the polyimide film was measured by using said sample, and it was 2.60 at a frequency of 100 kHz.

COMPARATIVE EXAMPLE 5

Into a flask equipped with a stirrer and a nitrogen introduction tube, 32.0 g (0.1 mol) of 2,2'-ditrifluoromethyl-4,4'-diaminobiphenyl and 291.3 g of NMP were introduced and dissolved. To this solution, 19.4 g (0.099 mol) of cyclobutanetetracarboxylic dianhydride was added at room temperature while paying attention to increase in the temperature of the solution, followed by stirring for 6 hours, to obtain a polyimide precursor (polyamic acid) solution. The obtained polyimide precursor had a reduced viscosity of 0.6 dl/g (in NMP at 30° C., concentration: 0.5 g/dl).

This solution was diluted with NMP to a total solid content of 10 wt %, and spin-coated on a quartz substrate at 2000 rpm, followed by heating at 80° C. for 5 minutes and at 300° C. for 1 hour to form a polyimide film having a thickness of 1.5×10³ nm.

The ultraviolet spectrum of the polyimide film was measured, and it was found that the transmittance at a wavelength of 300 nm was 24% and the transmittance at 400 nm was 93%, and the transmittance at an ultraviolet region was extremely low.

The polyimide film was further subjected to a heat treatment in an oven at 250° C. for one day, and then ultraviolet spectrum was measured, whereupon the transmittance at a wavelength of 300 nm was 20%, the transmittance at 400 nm was 88%, and the transmittance further decreased.

Then, the polyimide precursor solution was coated on a glass substrate, followed by baking at 300° C. to obtain a film having a film thickness of 10×10³ nm. The starting temperature of 5% weight loss was 440° C. as measured by using said film, and the glass transition temperature was 360° C.

Further, the birefringence measured by means of a prism coupler method was 0.0371 (TE direction: 1.5572, TM direction: 1.5201).

Then, the polyimide precursor solution was spin-coated at 4000 rpm on a glass substrate having an aluminum layer formed thereon by vapor deposition, followed by a heat treatment at 80° C. for 5 minutes and at 250° C. for 1 hour, to form a polyimide film having a thickness of 1.5×10³ nm. Further, an aluminum electrode having a diameter of 6 mm was formed on the polyimide film by vapor deposition to prepare a sample for electrical measurement.

The dielectric constant of the polyimide film was measured by using said sample, and it was 3.06 at a frequency of 100 kHz.

The results of Examples 1 to 3 and Comparative Examples 1 to 5 are shown in Tables 1 and 2.

TABLE 1

| | Transmittance (%) | | | |
|---|---|---|---|---|
| | After curing | | After 1 hour at 250° C. | |
| | 300 nm | 400 nm | 300 nm | 400 nm |
| Example 1 | 85 | 96 | 83 | 96 |
| Example 2 | 81 | 95 | 77 | 92 |
| Example 3 | 87 | 98 | 85 | 98 |
| Comparative Example 1 | 50 | 94 | 45 | 88 |
| Comparative Example 2 | 9 | 97 | 9 | 97 |
| Comparative Example 3 | 82 | 95 | 6 | 45 |
| Comparative Example 4 | 9 | 97 | 5 | 70 |
| Comparative Example 5 | 24 | 93 | 20 | 88 |

TABLE 2

| | Heat resistance, birefringent properties, dielectric constant | | | |
|---|---|---|---|---|
| | Starting temperature of 5% weight loss (° C.) | Glass transition temperature | Bi-refringence | Dielectric constant |
| Example 1 | 420 | 350 | 0.0023 | 2.77 |
| Example 2 | 430 | 378 | 0.0040 | 2.87 |
| Example 3 | 419 | 301 | 0.0030 | 2.58 |
| Comparative Example 1 | 420 | 350 | 0.0218 | 2.81 |
| Comparative Example 2 | 520 | 248 | 0.0034 | 2.63 |
| Comparative Example 3 | 360 | 310 | 0.0040 | 3.00 |
| Comparative Example 4 | 394 | 258 | 0.0063 | 2.60 |
| Comparative Example 5 | 440 | 360 | 0.0571 | 3.06 |

COMPARATIVE EXAMPLE 6

Into a flask equipped with a stirrer and a nitrogen introduction tube, 32.5 g (0.09 mol) of 2,2'-bis(3-methyl-4-aminophenyl)hexafluoropropane and 112 g of NMP were introduced and dissolved. It was attempted to obtain a polyimide precursor (polyamic acid) solution by adding 18.9 g (0.09 mol) of cyclopentanetetracarboxylic dianhydride at room temperature while paying attention to increase in the temperature of the solution, followed by stirring for 24 hours. However, as a result, the solution blackened, the polymerization did not substantially proceed, and no polyamic acid having a viscosity with which a coating film could be formed was obtained.

COMPARATIVE EXAMPLE 7

Into a flask equipped with a stirrer and a nitrogen introduction tube, 32.5 g (0.09 mol) of 2,2'-bis(3-methyl-4-aminophenyl)hexafluoropropane and 112 g of NMP were introduced and dissolved. It was attempted to obtain a polyimide precursor (polyamic acid) solution by adding 18.0 g (0.09 mol) of cyclohexane-1,2,4,5-tetracarboxylic dianhydride at room temperature while paying attention to increase in the temperature of the solution, followed by stirring for 24 hours. However, the polymerization did not substantially proceed, and no polyamic acid having a viscosity with which a coating film could be formed was obtained.

COMPARATIVE EXAMPLE 8

Into a flask equipped with a stirrer and a nitrogen introduction tube, 32.5 g (0.09 mol) of 2,2'-bis(3-methyl-4-aminophenyl)hexafluoropropane and 112 g of NMP were introduced and dissolved. It was attempted to obtain a polyimide precursor (polyamic acid) resin solution by adding 18.0 g (0.09 mol) of tetrahydrofuran-2,3,4,5-tetracarboxylic dianhydride at room temperature while paying attention to increase in the temperature of the solution, followed by stirring for 24 hours. However, the polymerization did not substantially proceed, and no polyamic acid having a viscosity with which a coating film could be formed was obtained.

COMPARATIVE EXAMPLE 9

Into a flask equipped with a stirrer and a nitrogen introduction tube, 32.5 g (0.09 mol) of 2,2'-bis(3-methyl-4-aminophenyl)hexafluoropropane and 224 g of NMP were introduced and dissolved. It was attempted to obtain a polyimide precursor (polyamic acid) solution by adding 17.8 g (0.09 mol) of 1,2,3,4-butanetetracarboxylic dianhydride at room temperature while paying attention to increase in the temperature of the solution, followed by stirring for 24 hours. However, the polymerization did not substantially proceed, and no polyamic acid having a viscosity with which a coating film could be formed was obtained.

INDUSTRIAL APPLICABILITY

The polyimide of the present invention is excellent in transparency at not only a visible region but also an ultraviolet region even after baking at a high temperature of from 270° C. to 350° C., having characteristics such as a low dielectric constant, a low birefringence and a high heat resistance, and useful as protective films and insulating films for liquid crystal display devices and semiconductor devices or optical waveguide materials for optical communication.

What is claimed is:

1. A polyimide precursor having a repeating unit represented by the following general formula (1):

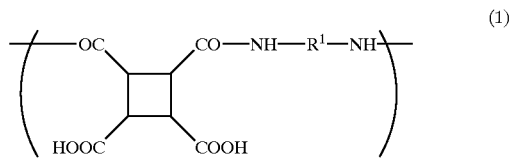

(1)

wherein $R^1$ is a bivalent organic group constituting a diamine, and wherein $R^1$ contains a bivalent organic group constituting a diamine having a hexafluoropropylidene group in its molecule represented by the following general formula (2):

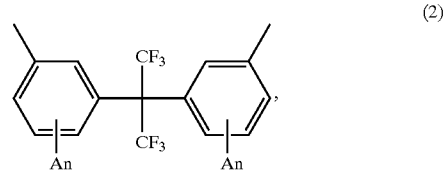

(2)

-continued

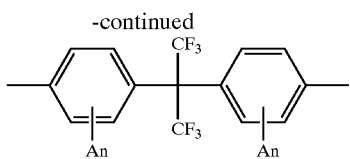

, wherein A is a hydrogen atom, a linear alkyl group including a methyl group, or a trifluoromethyl group, and n is an integer of from 1 to 4, and wherein said precursor has a reduced viscosity is from 0.05 to 5.0 dl/g in N-methylpyrrolidone at a temperature of 30° C., concentration: 0.5 g/dl.

2. A polyimide having a repeating unit of the general formula (3):

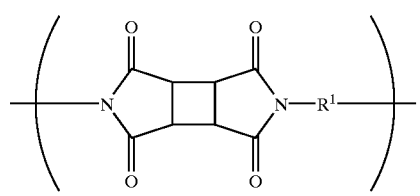

wherein $R^1$ is the same as in the above formula (2), which is obtained by imidizing one or more polyimide precursor(s) as defined in claim 1.

* * * * *